Sept. 20, 1955  W. B. DICKSON  2,718,316
TUBE SEPARATING APPARATUS
Filed May 20, 1952  2 Sheets-Sheet 1
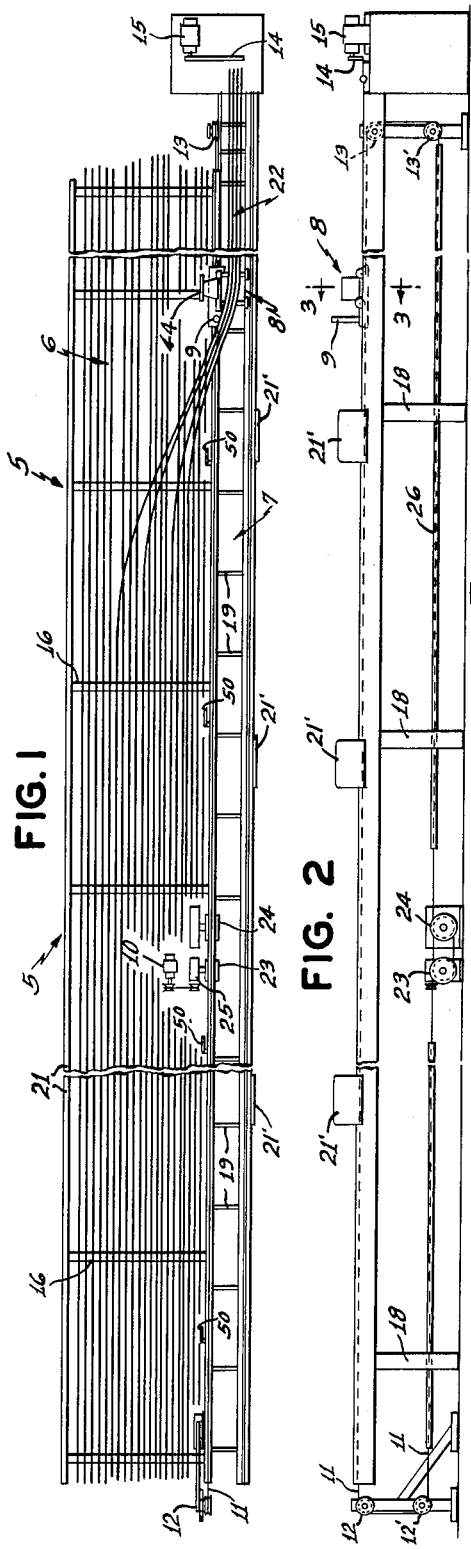
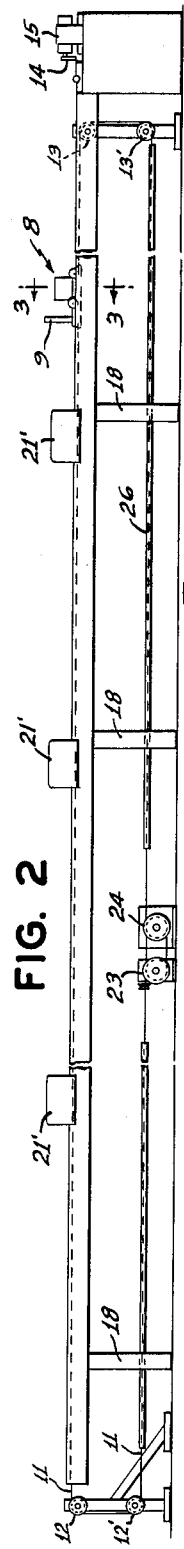
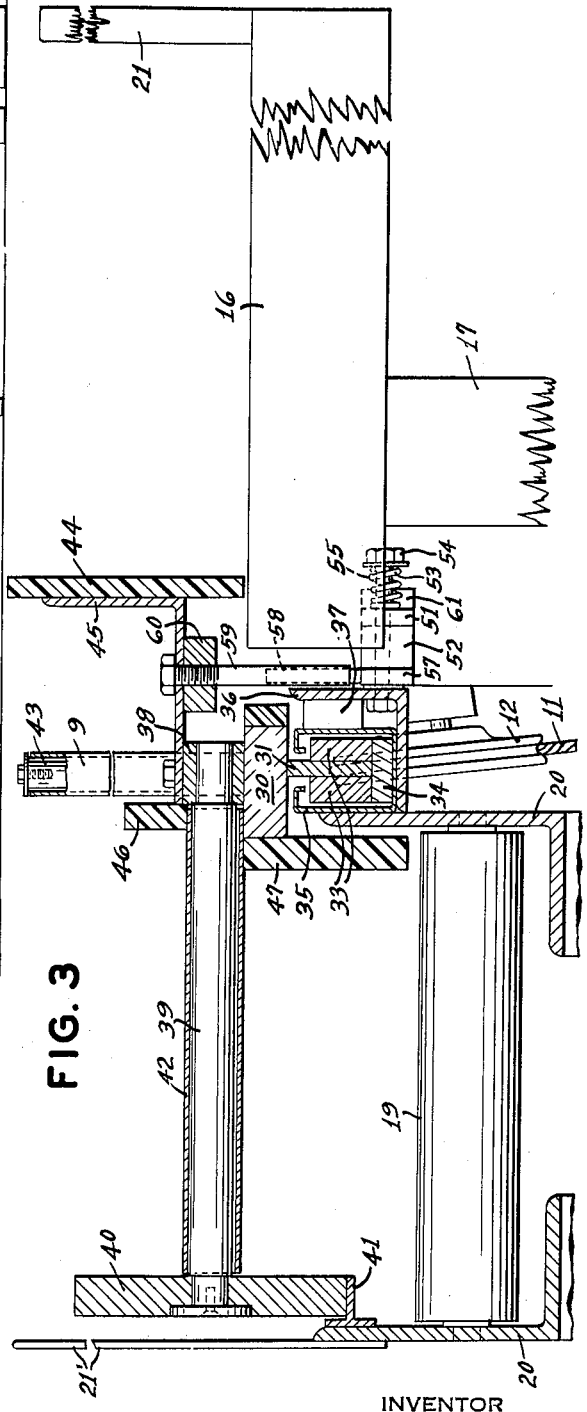
INVENTOR
William Bryan Dickson
BY
ATTORNEYS

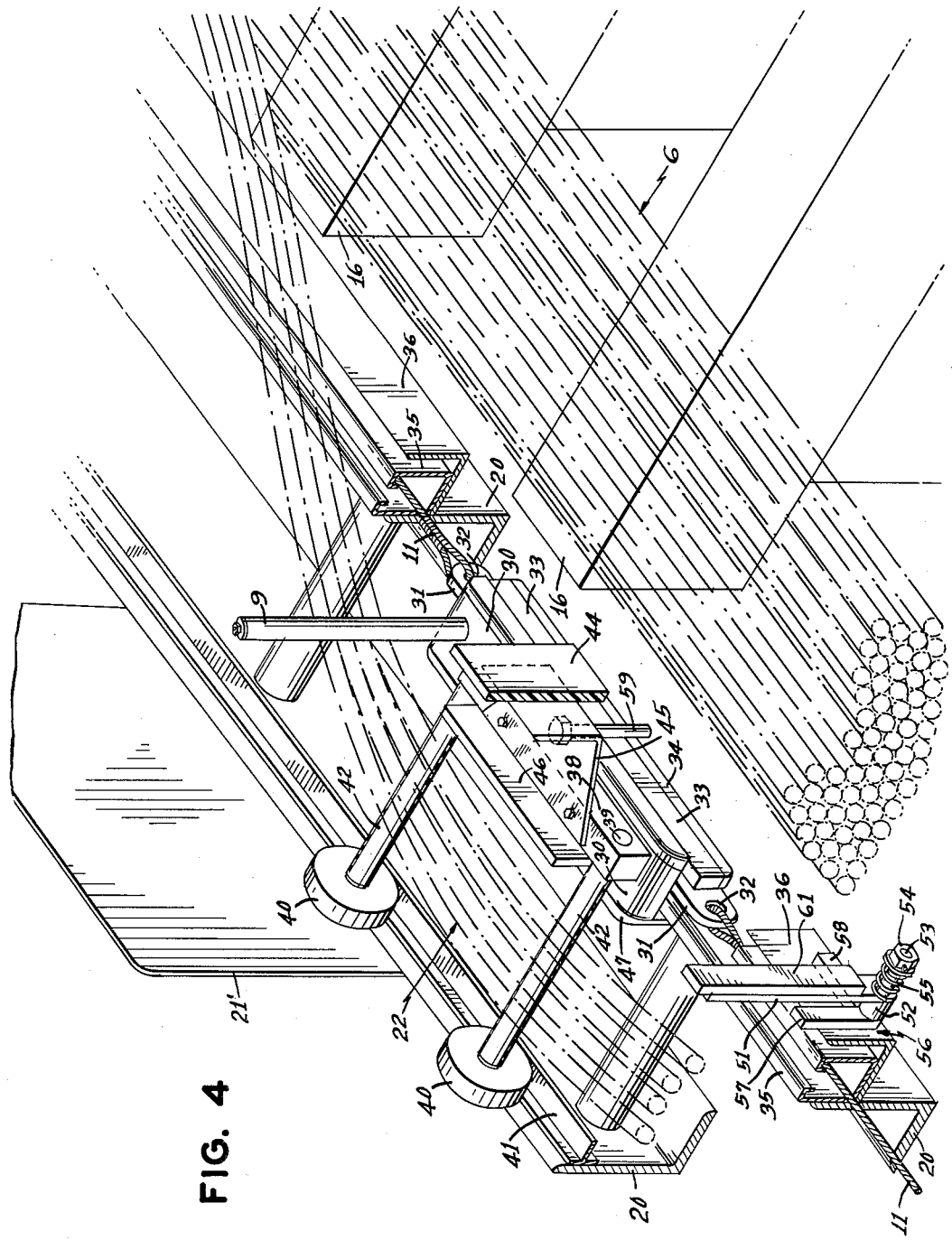

United States Patent Office 2,718,316
Patented Sept. 20, 1955

2,718,316

TUBE SEPARATING APPARATUS

William Bryan Dickson, Kenosha, Wis., assignor to The American Brass Company, a corporation of Connecticut Application May 20, 1952, Serial No. 288,861

8 Claims. (Cl. 214—8.5)

This invention relates to apparatus for separating a few long lengths of tubing (or other long flexible articles) from a large group of such lengths, and for depositing them on a conveyor (or other supporting structure).

In the manufacture of metallic tubing by extrusion or equivalent operations, the long lengths initially produced are deposited on a storage table or platform as they are finished. Because of their great length (which may extend up to 100 feet or more) and flexibility, and because for economic reasons the number produced and piled together is generally large, considerable physical effort and time must be expended in order manually to withdraw a few lengths at a time from the large group, in order to handle them conveniently for cutting to standard lengths or for other purposes.

This invention provides apparatus to facilitate the separation of a few pieces of long tubing lengths from a large group of such lengths and for depositing the separated pieces on any suitable support such as a conveyor along which they can be readily advanced to a cutting device, or on which they can be readily handled in the performance of some other finishing operation. The apparatus is also applicable to the separation and handling of a wide variety of other elongated objects, such as rods, angles, and other metal shapes in long lengths, but for convenience the following description of the invention refers only to its use in handling tubing lengths.

The new apparatus comprises supporting means such as a platform which is sufficiently long and otherwise of great enough dimensions to support the large main group of tubing lengths, and a conveyor (or equivalent supporting device) which extends alongside said platform for substantially its entire length. The conveyor is straddled by a trolley which is supported on guide rails and which is movable thereon substantially from one end to the other of the conveyor. The trolley carries a cleaving means, preferably in the form of a roller which is rotatable about its axis, mounted in a substantially vertical position and substantially between said conveyor and the supporting platform. A driving means is provided to move the trolley along the conveyor.

When the trolley is caused to move along the conveyor, the vertically extending cleaving means travels along a path approximately midway between the conveyor and the supporting platform. When the ends of a few lengths of tubing are lifted from the platform over the cleaving means and are held manually on the conveyor, and when the trolley is then moved down the length of the conveyor by its driving means, these few lengths of tubing are segregated from the remainder of the group on the platform and are forced over onto the conveyor.

Preferably one or more stop members are mounted pivotally between the platform and the conveyor to prevent any but the few selected tubing lengths from being drawn off the supporting platform onto the conveyor along with the few selected lengths as the trolley and its cleaving means are driven therealong. Each of these stop members is movable through an arcuate path of travel between a vertical position in which it projects a substantial distance above the upper surface of the supporting platform, and a horizontal position in which it lies substantially wholly below the upper surface of the platform. Means such as a striker bar carried by the trolley and cooperating with a bell crank actuator secured to the stop members serve to move each stop member to its vertical position as the trolley passes it in moving along the conveyor in the direction for sparating the few selected lengths from the main group. Vice versa, each stop member is thereby moved to its horizontal position as the trolley passes it in the opposite directoin.

Also, it is advantageous for a separating pad to be mounted vertically on the side of the trolley adjacent to the supporting platform to assist the stop members in preventing any other lengths of tubing than the selected few from being pulled from the platform on to the conveyor as the trolley moves along its path of travel.

An advantageous embodiment of this invention is described below with reference to the accompanying drawings, in which:

Fig. 1 is a plan of a supporting platform and conveyor layout, with a trolley of the character described above straddling the conveyor and movable therealong;

Fig. 2 is an elevation of the layout shown in Fig. 1;

Fig. 3 is a section taken substantially along the line 3—3 of Fig. 2, showing details of the trolley and the conveyor on an enlarged scale; and Fig. 4 is a perspective, partly in section and on an enlarged scale, showing the conveyor and the trolley straddling it.

The embodiment of this invention shown in the drawings comprises a loading table or supporting platform 5 carrying a large main group 6 of long lengths of tubing, and a conveyor 7 of substantially the same length as the platform mounted alongside and parallel to it, as best shown in Figs. 1 and 2. A trolley 8 straddles the conveyor and is supported above it adjacent to its upper surface. A cleaving roller 9 is mounted vertically on the trolley on the side thereof adjacent to the supporting platform, substantially midway between the platform and the conveyor. The trolley can be moved up and down the length of the conveyor by operation of a motor 10 which actuates a drive cable 11. The cable 11 is attached at both ends to the trolley, and is looped about the length of the conveyor, being supported at either end of the conveyor on pulleys 12, 12', 13 and 13'. A saw 14 driven by a motor 15 is shown located at one end of the conveyor 7 in position for cutting long lengths of tubing, fed to it along the conveyor, to shorter standard lengths.

The construction of the supporting platform 5 and of the conveyor 7 is clearly shown in Figs. 1 to 3. The supporting platform comprises a series of parallel crossbeams 16 which are spaced at uniform intervals and are supported on posts 17. The upper surfaces of the crossbeams form a platform which supports the large group 6 of tubing lengths. The conveyor 7 which extends alongside the supporting platform 5 is mounted at substantially the same height as the platform on legs 18. It comprises a series of freely rotatable horizontal rollers 19 which are supported in spaced parallel relation by two longitudinal conveyor frame members 20. An edge board 21 is advantageously provided along the exposed edge of the platform to prevent any part of the large group of tubing lengths from being displaced therefrom, and corresponding edge guards 21' are provided along the exposed side of the conveyor.

The cable 11 and other elements of the trolley drive mechanism can be seen best in Fig. 2. The cable 11 passes in a series of loops around a pair of multi-grooved pulleys 23 and 24 which are mounted underneath the bar bolt 59 is positioned on the bracket so that it travels, as the trolley is moved along the conveyor, in a path to strike against whichever arm 57 or 58 of the stop member actuator happens to be in a vertical position. Thereby, when the striker bar engages with one or the other of the bell crank actuator, the stop member is moved from its vertical to its horizontal position, or vice versa. The stop members are initially arranged so that with the trolley at its starting position adjacent the saw, their arms 51 lie in their horizontal positions and the arms 58 of the bell crank actuators project substantially vertically into position to be engaged by the striker bar of the trolley. Then, as the trolley is drawn along the conveyor in a direction away from the saw, each stop member is moved to its vertical position as the trolley passes it. The arms 51 of the stop members thereby are caused to project high enough above the upper surface of the platform 5 so as to prevent accidental transfer of lengths of tubing from the platform to the conveyor. (The arms 51 may be faced on the side toward the platform with a strip 61 of wood, resinous plastic, or other material which will not mar any lengths of tubing against which it rubs when the arm moves through its arcuate path of travel.) When the direction of motion of the trolley is reversed and it is returned to its original position, each stop member is tilted again to its horizontal position as the trolley passes it, by engagement of the striker bar 59 with the other arm 57 of the bell crank actuator, so that the stop members will not interfere with the transfer of the next selected few lengths of tubing from the platform 5 to the conveyor 7.

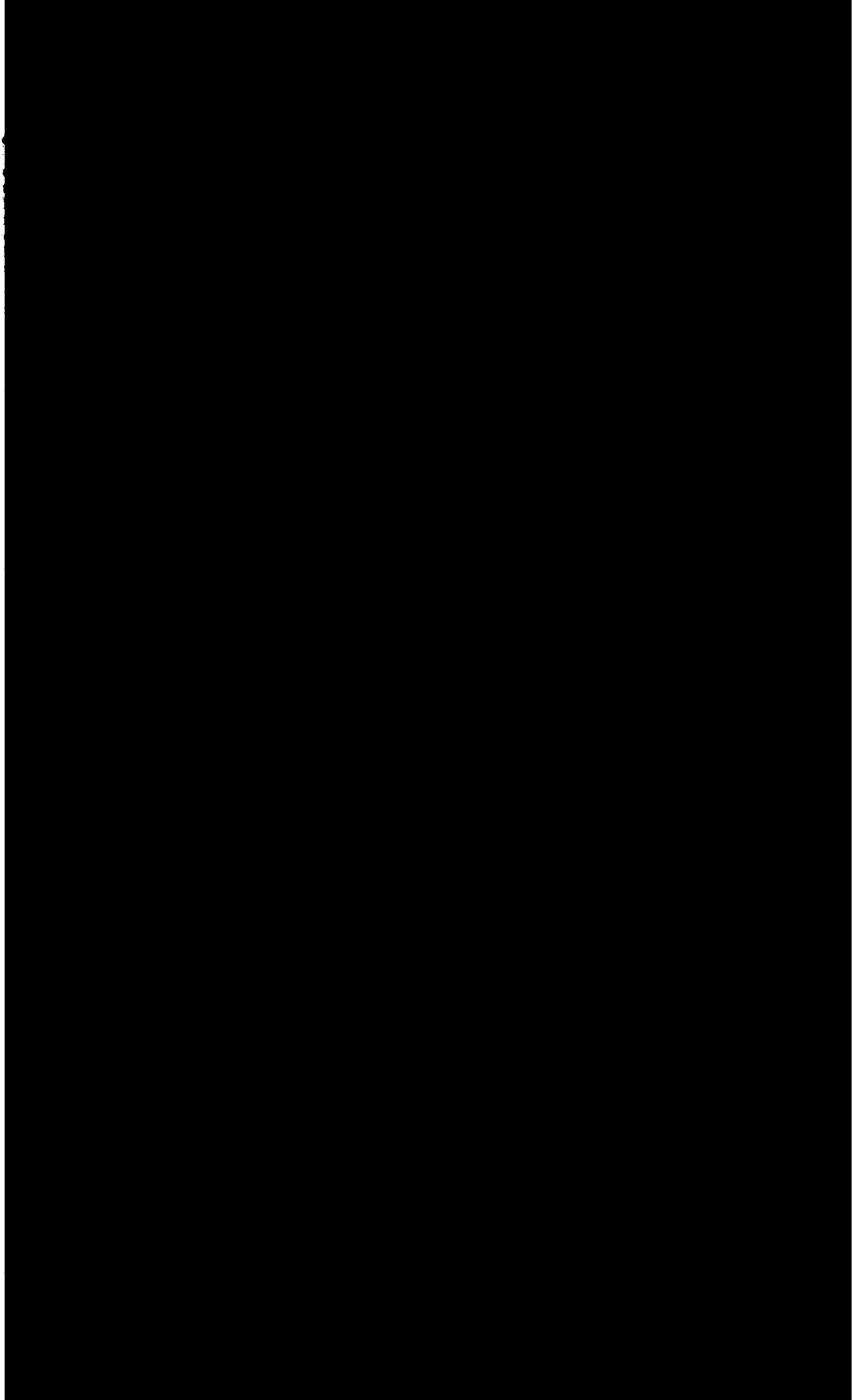

I claim:

1. Apparatus for separating a few long lengths of tubing from a large main group thereof comprising in combination a platform of dimensions great enough to support said main group of tubing lengths and upon which said main group rests, a conveyor extending alongside said platform for substantially its entire length, a trolley straddling said conveyor, said trolley being movable along said conveyor from one end thereof to the other, cleaving means mounted in a vertical position upon said trolley substantially between said conveyor and said platform, and driving means to move said trolley along said conveyor.

2. Apparatus for separating a few long lengths of tubing from a large main group thereof comprising in combination a platform of sufficient length and width to support said main group of tubing lengths and upon which said main group rests, a conveyor extending alongside said platform for substantially its entire length, horizontal guide rails positioned on either side of said conveyor and extending substantially the entire length thereof, a trolley straddling said conveyor and supported upon said rails, said trolley being movable on said rails substantially from one end to the other of said conveyor, a cleaving roller mounted vertically upon said trolley on the side thereof adjacent said platform, and driving means to move said trolley along said rails.

3. Apparatus for separating a few long lengths of tubing from a large main group thereof comprising in combination a platform of sufficient length to support said main group of tubing lengths and upon which said main group rests, a conveyor extending alongside said platform for substantially its entire length, a trolley straddling said conveyor, said trolley being movable along said conveyor from one end thereof to the other, at least one stop member pivotally mounted between said platform and said conveyor, said stop member being movable through an arcuate path of travel between a vertical position in which it projects substantially above the upper surface of said platform and a horizontal position in which it lies substantially wholly below the upper surface of said platform, means carried by said trolley for moving said stop member to its vertical position as the trolley passes it in one direction and for moving it to its horizontal position as the trolley passes it in the other direction, cleaving means mounted vertically upon said trolley on the side thereof adjacent to said platform, and driving means to move said trolley along said conveyor.

4. Apparatus for separating a few long lengths of tubing from a large main group thereof comprising in combination a platform of sufficient length to support said main group of tubing lengths and upon which said main group rests, a conveyor extending alongside said platform for substantially its entire length, a trolley straddling said conveyor and movable therealong from one end thereof to the other, a plurality of stop members pivotally mounted at spaced intervals along the side of said platform between said platform and said conveyor, each of said stop members being movable through an arcuate path of travel between a vertical position in which it projects substantially above the upper surface of said platform and a horizontal position in which it lies substantially wholly below the upper surface of said platform, a bell crank actuator having a pair of angularly spaced arms secured to each stop member for moving it between its vertical and horizontal positions, a striker bar mounted on the trolley in position to engage one or the other of said actuator arms as the trolley passes by the stop member actuated thereby, whereby the stop member is moved to its vertical position as the trolley passes it in one direction and is moved to its horizontal position as the trolley passes it in the other direction, cleaving means mounted vertically on said trolley on the side thereof adjacent to said platform, and driving means to move said trolley along said conveyor.

5. Apparatus for separating a few long lengths of tubing of a large main group thereof, comprising in combination a platform of sufficient length and width to support said main group of tubing lengths and upon which said main group rests, a conveyor extending alongside said platform for substantially its entire length, horizontal guide rails positioned on either side of said conveyor and extending substantially the entire length thereof, a trolley straddling said conveyor and being supported upon said rails, said trolley being movable on said rails substantially from one end to the other of said conveyor, a plurality of stop members pivotally mounted between said platform and said conveyor, each of said stop members being movable through an arcuate path of travel between a vertical position in which it projects substantially above the upper surface of said platform and a horizontal position in which it lies substantially wholly below the upper surface of said platform, means carried by said trolley for moving each of said stop members to its vertical position as the trolley passes it in one direction and for moving it to its horizontal position as the trolley passes it in the other direction, a cleaving roller mounted for rotation about a vertical axis on the side of said trolley adjacent said platform, and drive means for moving said trolley along said rails.

6. Apparatus for separating a few long lengths of tubing from a large main group thereof comprising in combination a platform of sufficient length to support said main group of tubing lengths and upon which said main group rests, a conveyor extending alongside said platform for substantially its entire length, a trolley straddling said conveyor, said trolley being movable along said conveyor substantially from one end thereof to the other, a cleaving roller mounted vertically at one end of said trolley on the side thereof adjacent said platform, a separating pad projecting substantially vertically from the central portion of the side edge of said trolley adjacent said platform, and driving means to move said trolley along said conveyor.

7. In apparatus of the character described, a trolley comprising a longitudinally extending frame member, trolley support means underlying said frame member, at least one outrigger shaft projecting laterally from said frame member and carrying a supporting wheel at its outer end, thereby to support said frame member in a horizontally stable position, and a cleaving roller mounted